(12) United States Patent
Paulk

(10) Patent No.: US 9,390,105 B2
(45) Date of Patent: Jul. 12, 2016

(54) SYSTEM AND METHODS FOR STORING AND ANALYZING GEOGRAPHICALLY-REFERENCED DATA

(71) Applicant: Raytheon Company, Waltham, MA (US)

(72) Inventor: Roderic W. Paulk, Wylie, TX (US)

(73) Assignee: Raytheon Company, Waltham, MA (US)

( * ) Notice: Subject to any disclaimer, the term of this patent is extended or adjusted under 35 U.S.C. 154(b) by 216 days.

(21) Appl. No.: 13/970,824

(22) Filed: Aug. 20, 2013

(65) Prior Publication Data

US 2015/0058354 A1      Feb. 26, 2015

(51) Int. Cl.
*G06F 17/30* (2006.01)

(52) U.S. Cl.
CPC .... *G06F 17/30241* (2013.01); *G06F 17/30336* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,243,039 B1 * | 6/2001 | Elliot | ...................... | G01S 19/16 342/357.74 |
| 7,533,112 B2 * | 5/2009 | Beatty | ............... | G06F 17/30587 |
| 7,991,769 B2 * | 8/2011 | Fontoura | ........... | G06F 17/30646 707/713 |
| 2004/0039652 A1 * | 2/2004 | Tighe | ..................... | G06Q 10/08 705/26.81 |
| 2009/0100007 A1 * | 4/2009 | Campbell | ........... | G06F 17/3087 |
| 2011/0113116 A1 * | 5/2011 | Burdette | ........... | H04L 29/12792 709/217 |

OTHER PUBLICATIONS

Nishimura, Shoji, et al., "MD-HBase: A Scalable Multi-dimensional Data Infrastructure for Location Aware Services", [online]. [archived on Jan. 31, 2012]. Retrieved from the Internet: <URL: https://web.archive.org/web/20120131160319/http://www.cs.ucsb.edu/~sudipto/papers/md-hbase.pdf>, (2012), 10 pgs.
Partyka, Jeffrey, et al., "MagicEye: A Big Data Approach to Activity Based Intelligence", submitted to SIAM—2013, (2013), 9 pgs.

* cited by examiner

*Primary Examiner* — Etienne Leroux
(74) *Attorney, Agent, or Firm* — Schwegman Lundberg & Woessner, P.A.

(57) ABSTRACT

Embodiments of a system and method for storing and analyzing geographically-referenced data are generally described herein. In some embodiments, the system includes one or more computing devices to generate an index value for geographically referenced data. The index value may be representative of a geographic location corresponding to the geographically-referenced data. The system may also include one or more storage devices configured to store the geographically-referenced data and the index value such that the geographically-referenced data is stored contiguously with other geographically-referenced data of the geographic location based on the index value.

19 Claims, 4 Drawing Sheets

| C | D | E | F |
| 8 | 9 | A | B |
| 4 | 5 | 6 | 7 |
| 0 | 1 | 2 | 3 |

SYSTEM AND METHODS FOR STORING AND ANALYZING GEOGRAPHICALLY-REFERENCED DATA

TECHNICAL FIELD

Embodiments pertain to processing of geographically-referenced data. Some embodiments relate to acquisition and distributed storage of geographically-referenced data.

BACKGROUND

There has been a recent upsurge in the amount of geographically-referenced data that is available, leading to high data-insertion rates that may overwhelm systems that store and analyze geographically-referenced data. There has also been an upsurge in the amount of geographically-referenced data associated with social media applications, and such data may provide opportunities for further analysis based on social context of the geographically-referenced data. Thus, there are general needs for improved systems and methods for storing and analyzing large quantities of geographically-referenced data.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Recently, government and defense corporations have been leveraging data stores of geographically-referenced data in order to glean insights and determine activity patterns (APs) within or among geographic areas. Wide area surveillance (WAS) systems may generate aerial imagery and capture sensor measurements from areas of interest (AOI) of varying sizes. WAS capability may assist defense or surveillance operations in increasing situational awareness (SA) by providing additional data and methods for assessing activity within or near AOIs. WAS systems may also be able to predict when certain levels of activity may occur, and deploy assets at those times.

However, processing and memory limitations of on-board sensor platforms, as well as limitations of network bandwidth when transferring measurements to ground stations, may restrict the amount of data that WAS systems can process. This may make it more difficult to infer fine-grained APs. For example, determining whether a geographic area experiences regular, weekly APs may be difficult or impossible because there is not enough sensor data to make such fine-grained insights.

Further, some current systems cannot associate point of interest (POI) data with their corresponding APs. While sensors often may be able to identify some POI classes, these sensors may not be able to identify a large range of POI classes that might provide a social context for nearby activities. For example, it may be desirable to determine if a given area is a business district. In this illustrative example, POIs may be of classes including "office building," "bus station," "restaurant," "manufacturing facility," etc. Sensors often lack the ability to make such distinctions for these POIs, because social context, rather than physical structure, distinguishes these POIs.

Current systems also may not effectively store large amounts of geographically-referenced data, and some current database management systems (DBMSs) may not be able to handle complex data queries of large amounts of data.

Some embodiments may address the above concerns, as well as other concerns, by using distributed computing systems over clusters of computing devices and storage devices. In order to provide the capability to analyze APs based on social context, some embodiments may integrate open source intelligence (OSINT) with other types of intelligence to enhance WAS capabilities. OSINT may include freely available repositories of social media data such as geolocated Twitter data, Foursquare check-ins, etc.

Figure 1:
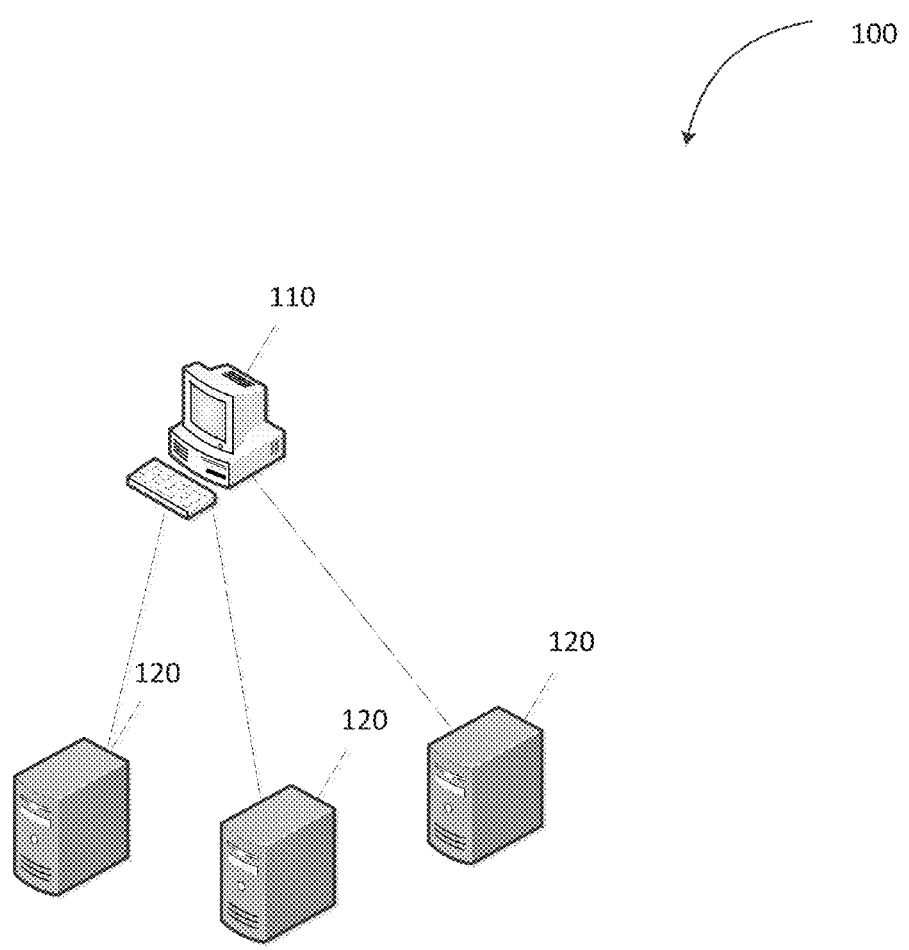
FIG. 1 is a functional diagram of a system in accordance with some embodiments.

FIG. 1 is a functional diagram of a system 100 in accordance with some embodiments. The system 100 may be a distributed computing system including at least one computing device 110. The system 100 may include storage devices 120. While FIG. 1 illustrates one computing device 110 and several storage devices 120, the system 100 may include any number of computing devices 110 and storage devices 120. A computing device 110 may also perform functions of a storage device 120, while a storage device 120 may perform at least some functions of a computing device 110.

The system 100 may utilize Hadoop. Hadoop, by Apache Systems, is an open source implementation of a distributed computing system. However, the system 100 is not limited to Hadoop, nor is the system 100 limited to use of open source frameworks.

The system 100 may implement a Hadoop MapReduce computing framework to divide a job into many small tasks. When the job is executed, MapReduce tasks are spawned and distributed among the computing devices 110 or storage devices 110 in the system 100. Any computing device 110 or storage device 120 may operate within the MapReduce computing framework to execute one or more of these tasks. These tasks may execute in parallel to perform part of a larger computation.

In addition, the system 100 may provide a Hadoop distributed file system (HDFS) that may store data on the computing devices 110 or storage devices 120, to provide higher aggregate bandwidth across the system 100. HDFS may store results of computations generated by functions of the MapReduce computing framework described above. HDFS may also store descriptive statistics, such as the date range of captured data. HDFS may store intermediate computations used as inputs for larger jobs.

At least one of the computing devices 110 or storage devices 120 may execute an application to manage the HDFS by, for example, keeping a directory tree of all files in the HDFS. For example, one of the computing devices 110 or storage devices 120 may execute a Hadoop NameNode to manage the HDFS for the system 100. One of the computing devices 110 or storage devices 120 may execute a service, for example a Hadoop JobTracker application, to assign tasks, for example tasks related to functions of the Hadoop MapReduce computing framework, to computing devices 110 or storage devices 120 in the system 100.

The computing device 110 or storage devices 120, operating within the MapReduce computing framework described above, may insert MapReduce-processed data into a database distributed across the computing devices 110 and storage devices 120. This database may operate using, for example, Hadoop HBase technologies. HBase is a column-oriented DBMS that runs on top of HDFS. The MapReduce-processed data may be imagery, text, audio, or any other type of data. The data may be stored as binary large objects ("blobs") or as any other type of data object in a column or column family of the database. Other relevant fields, such as data source, external identifiers, or other meta-information may be stored a metadata column family of the database. In some embodiments, columns may include column versions based on the column's timestamp of creation. In some embodiments, MapReduce jobs may get data inputs from selected column families and columns within HBase tables. In some embodiments, the database may allow operators to add any number of user-defined or predefined columns or column families.

In some embodiments, this database may allow operators to increase or optimize the ability to handle a large number of data reads by using, for example, regional servers (not shown in FIG. 1) to associate large blocks of contiguous data in a table with a particular computing device 110 or storage device 120.

The computing device 110 may be configured to generate an index value for geographically-referenced data. The index value is described below with respect to FIG. 2.

Figure 2:
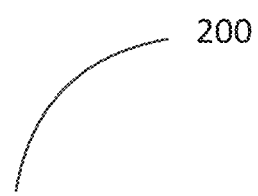
FIG. 2 is an example illustration of an index value representing a geographic area of the Earth's surface.

FIG. 2 is an example illustration of an index value representing a geographic area of the Earth's surface. Some embodiments use a flat Earth model to refer to geographic areas by recursively dividing the Earth into sixteen geographic areas. The flat Earth model further subdivides these geographic areas into 16 subareas, and so forth.

The number of geographic areas of a given index value length is $16^L$, where L indicates the number of digits of the index value. Because each geographic area has two dimensions, the number of geographic areas along a single dimension is $4^L$. The length of a geographic area with an index value length L at the equator may be computed according to Equation (1):

$$\text{length} = 40{,}075{,}017 / 4^L \qquad (1)$$

The constant 40,075,017 represents the circumference of the Earth, in meters, at the equator. For an index value length of 12, for example, the length of one geographic area at the equator is 2.389 meters. At other areas of the Earth at different latitude, the length of the geographic area will change in proportion to the changing circumference of the Earth at that latitude.

The index value may be representative of a geographic location corresponding to the geographically-referenced data. For example, the index value may represent latitude and longitude pairs of geographical coordinates of a geographic area of the Earth's surface that includes the geographic location that corresponds to the geographically-referenced data.

The index value may include a first numerical digit and a second numerical digit that is a less significant digit of the index value than the first numerical digit. The first numerical digit may be representative of a geographic area that includes the geographic location corresponding to the geographically-referenced data. The second numerical digit may be representative of a second geographic area smaller than the first geographic area. The second geographic area may be included within the first geographic area such that the second geographic area also includes the geographic location corresponding to the geographically-referenced data.

In the illustrative example of FIG. 2, a geographic area 200 is broken into 16 subareas numbered zero through F in hexadecimal format. Subarea 4 of geographic area 200 is further broken into a set of 16 subareas. Assuming for illustrative purposes that geographic area 200 has an index value of 0, subarea 4 would have an index value of '04.' Each additional digit of the index value would represent further subareas. For example subarea C of subarea 4 of geographic area 200 would be represented by an index value of '04C.' In other words, each additional digit in the index values allows a finer resolution such that an index value may represent a smaller geographic area.

Referring again to FIG. 1, the storage devices 120 may be configured to store the geographically-referenced data and the index value such that the geographically-referenced data is stored contiguously with other geographically-referenced data of the geographic location based on the index value. As discussed above, the computing device 110 may also perform this functionality of the storage devices 120 by storing geographically-referenced data and corresponding index values.

The storage devices 120 and computing device 110 may further be configured to store the geographically-referenced data in a distributed manner such that geographically-referenced data relevant to a first geographic region is stored on a same storage device 120 or computing device 110, in a physically-sequential manner based on index values of the geographically-referenced data, as other geographically-referenced data relevant to the first geographic region.

The storage devices 120 and computing device 110 may be geographically located in different geographic regions. As such, the storage devices 120 and computing device 110 may be located in the same geographic region that corresponds to the data stored in that storage device 120 or computing device 110. In this manner, some embodiments may create a landmark enrichment paradigm where geographically-referenced data related to each geographic area is physically stored within the relevant geographic area. By co-locating data related to a geographic area, some embodiments may provide more efficient access and organization of spatially relevant data for a variety of algorithms including activity based intelligence and patterns of life mining.

Figure 3:
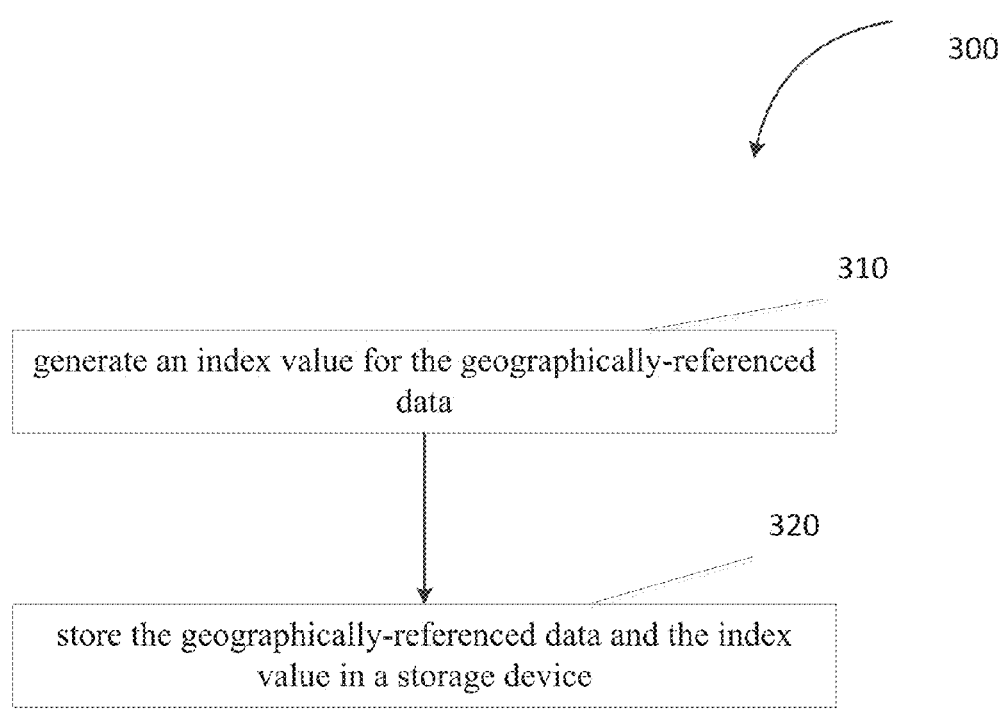
FIG. 3 is a flow chart of a procedure for storing geographically-referenced data.

FIG. 3 is a flow chart of a procedure 300 for storing geographically-referenced data. The procedure may be performed by one or more of the computing devices 110 (FIG. 1) or storage devices 120 (FIG. 1).

In operation 310, a computing device 110 may generate an index value for the geographically-referenced data. The index value may be representative of a geographic location corresponding to the geographically-referenced data as described above with respect to FIG. 1-2.

In operation 320, the computing device 110 may store the geographically-referenced data and the index value in a storage device 120 or computing device 110. As discussed above with respect to FIG. 1, the computing device 110 may store the geographically-referenced data such that the geographically-referenced data is stored contiguous to other geographically-referenced data of the geographic location, based on the index value. In other words, based on the index value of geographically-referenced data, geographic areas and their subareas on the Earth's surface can be determined as described above with respect to FIG. 2. Therefore, based on index values for geographically-referenced data, it can be determined which geographically-referenced data is relevant to the same subareas, or geographic locations on the surface of the Earth.

Two or more storage devices 120 may store the geographically-referenced data in a distributed manner such that geographically-referenced data relevant to a first geographic region (based on index values) is stored on the same storage device 120 as other geographically-referenced data relevant to the first geographic region. The geographically-referenced data may be arranged in a physically sequential manner, in an order based on the corresponding index values, on the physical hard drive of the corresponding storage device 120. Each of the two or more storage devices 120 may be geographically located in their relevant geographic regions to provide for distributed and local processing of geographically-referenced data. As discussed above, the computing device 110 may also perform this functionality of the storage devices 120 by storing geographically-referenced data.

The system 100 (FIG. 1) may receive the geographically-referenced data from a social application, for example from a message texting application, a blogging application or a social media application (e.g., Foursquare, Pinterest, Facebook, Twitter, etc.). The system 100 may store a time stamp representative of a time associated with the geographically-referenced data such that the time stamp is associated with the geographically-referenced data.

Figure 4:
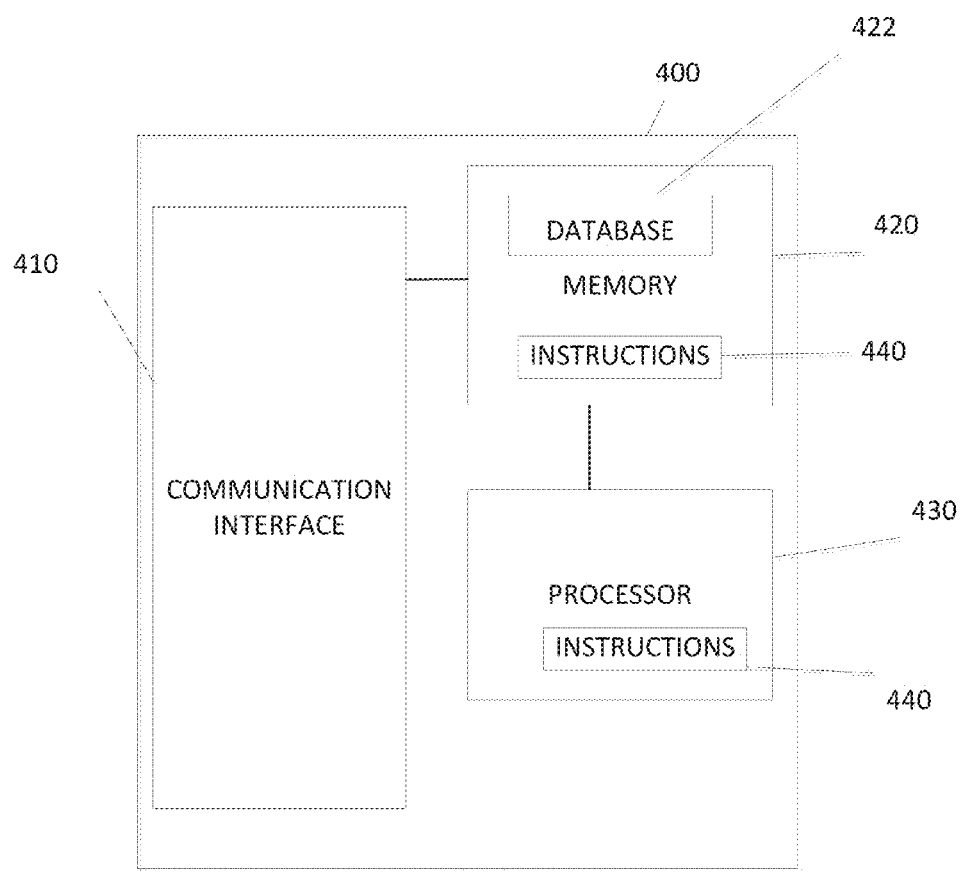
FIG. 4 is a block diagram of a computer for implementing methods according to example embodiments.

FIG. 4 is a block diagram of a computer 400 for implementing methods according to example embodiments. The computer 400 may be appropriate for performing the functionalities of a computing device 110 or storage device 120 (FIG. 1). The computer 400 may be appropriate for storing geographically-referenced data and for analyzing APs in a geographic location based on the geographically-referenced data.

The computer 400 may include a communication interface 410. The communication interface 410 may be arranged to communicate over a network with other computing devices 110 or storage devices 120 of the system 100 (FIG. 1).

The computer 400 may include a memory 420. In one embodiment, memory 420 includes, but is not limited to, random access memory (RAM), dynamic RAM (DRAM), static RAM (SRAM), synchronous DRAM (SDRAM), double data rate (DDR) SDRAM (DDR-SDRAM), or any device capable of supporting high-speed buffering of data.

The computer 400 may include a processor 430. The processor 430 may be arranged to access a database 422 on the computer 400 or on other computing devices 110 or storage devices 120 of the system 100 (FIG. 1). The processor 430 may use first index values representative of a geographic location as described above with respect to FIG. 2, to retrieve data relevant to the geographic location.

The processor 430 may analyze APs at the geographic location based on time stamps associated with the retrieved data.

The processor 430 may generate a model to describe the AP of the geographic location.

The processor 430 may store the model in the database such that the model is associated with the index value representative of the geographic location. The processor 430 may analyze APs of another geographic location geographically close to the geographic location by accessing the database 422 using a second index value. The second index value may correspond to the first index values from which a least significant digit has been truncated. As described above with respect to FIG. 2, by truncating a least significant digit, the processor 430 may reference a larger geographic area, with less granularity. This larger geographic area will include a subarea referenced by the original, first index value.

The processor 430 may perform at least the above operations based on algorithms such as those described below with respect to Equations (2)-(6) and Table 1.

In some embodiments, the system 100 may analyze APs to determine whether a given hour or other time interval for a weekly activity pattern (AP) is anomalous for a given area of interest (AOI) based on historical APs for that AOI.

In some embodiments, processors 430, included in computing devices 110 or storage devices 120, may execute a MapReduce job, as described above, to retrieve geographically-referenced data within a geographic area based on index values of the geographically-referenced data.

In an example embodiment, a processor 430 may implement instructions, which may be similar to the illustrative example pseudo code listed below in Table 1, to detect whether activity during one hour is anomalous:

TABLE 1

Algorithm for hour outlier detection application of anomaly detection.

```
Over all AOIs simultaneously using MapReduce {
  for each AOI a {
    W=Get all weekly APs for a
    for each week in W {
      H = Get all hourly detections for week
      Normalize H
    }
    for hour = 0 to 167 {
      Construct activity model for H[our] across W
    }
    for each week in W {
      for hour = 0 to 167 {
        Use activity model H[hour] to determine if
        week[hour] is an outlier
      }
    }
  }
}
```

In the illustrative example pseudo code, the processor 430 may construct a model of the normalized count of detections per hour during a typical week across all weekly APs for an AOI a. Further, the processor 430 may normalize the number of detections in a given week based on the maximum number of detections occurring for an hour in that week. Some embodiments may provide models for one or more hours of the week across all APs of an AOI a. For each week, the processor 430 may iterate through each hour and determine whether the detection count for that hour is an outlier, or anomaly, based on the distribution for that hour that the processor 430 constructed previously. The processor 430 may further store this analysis result within the database, on a storage device 120 associated with the geographic area that includes the AOI. For example, the processor 430 may store this analysis result in a new or existing column associated with the index value associated with the geographic area that includes the AOI.

In some embodiments, the system 100 may determine whether a weekly AP for an AOI is anomalous, given historical data of the AOI. The processor 430 may use normalized detection counts for each hour in a given weekly AP computed above. The processor 430 may further compute the mean and standard deviation for the models.

For the jth hour over m APs for an AOI, the processor 430 may compute the mean number of detections at hour j according to Equation (2):

$$\mu_j = \frac{1}{m}\sum_{i=0}^{m} x_j^i \quad (2)$$

The processor 430 may compute the standard deviation for hour j over m APs according to Equation (3):

$$\sigma_i^2 = \frac{1}{m}\sum_{i=0}^{m} (x_j^i - \mu_j) \quad (3)$$

The processor 430 may calculate whether a given weekly AP's detect counts are anomalous according to Equation (4):

$$\text{value}(x^a) = \pi_{i=0}^{m} N(\chi_i; \mu_i; \sigma_i^2) \quad (4)$$

where $x^a$ is the number of detections at a for each hour of in the weekly AP, and value($x^a_i$) is a representative value for how anomalous $x^a$ is. In this equation, $x^a$ is a vector including 168 detections (e.g., up to 168. The right side of the equation indicates the i-th normal distribution, with parameters $\mu_i$ and $\sigma$2. This is the distribution of the number of detections for hour xi over all APs at AOI a.

Equation (4) may be re-written as:

$$\pi_{i=0}^{m} N(\chi_i; \mu_i; \sigma_i^2) = \pi_{j=0}^{167} p(\chi_j; \mu_j; \sigma_j^2) \quad (5)$$

Equation 6 ties equation 3 to equation 5:

$$\text{value}(x^a) = \Pi_{j=0}^{167} \frac{1}{\sigma_j \sqrt{2\pi}} e^{-1/2\left(\frac{(x_j - \mu_j)}{\sigma_j}\right)^2} \quad (6)$$

where the right-hand side is the normal distribution equation. If the value calculated by Equation (6) is less than a user specified threshold $\epsilon$, then the processor 430 may determine that the weekly AP of interest at AOI a is anomalous.

The processor 430 may determine whether the anomalous activity is confined to the AOI a, or if this activity goes beyond the AOI a to other nearby geographic areas. In some embodiments, the processor 430 may consider anomalous activity that may occur in other AOIs geographically around a. For example, anomalous activity around a may indicate that a natural disaster such as an earthquake or flood was affecting the geographic area including a and nearby AOIs. In some embodiments, the processor 430 may consider anomalous activity occurring in other AOIs that are similar to a. For example, anomalous activity in similar AOIs may indicate that similar restaurants or other commercial locations are making similar offers that lead to similar APs at their locations. In this fashion, the processor 430 may detect unusual APs based on social context information stored in association with geographically-referenced data.

The processor 430 may generate a human-readable label for the geographic location based on social media data captured with respect to the geographic location. The processor 430 may store the human-readable label such that the human readable label is associated with the index value representative of the geographic location.

Embodiments may also be implemented as instructions 440 stored on a computer-readable storage device, which may be read and executed by at least one processor 430 to perform the operations described herein. In some embodiments, the instructions 440 are stored on the processor 430 or the memory 420 such that the processor 430 and the memory 420 act as computer-readable mediums. A computer-readable storage device may include any non-transitory mechanism for storing information in a form readable by a machine (e.g., a computer). For example, a computer-readable storage device may include ROM, RAM, magnetic disk storage media, optical storage media, flash-memory devices, and other storage devices and media.

Although the system 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, FPGAs, application specific integrated circuits (ASICs), radio-frequency integrated circuits (RFICs) and combinations of various hardware and logic circuitry for performing at least the functions described herein. In some embodiments, the functional elements of the system 100 may refer to one or more processes operating on one or more processing elements.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. For example, the program code may execute, in whole or in part, on any computing device 110 or storage device 120 of the system 100 as part of a distributed MapReduce framework as described above with respect to FIG. 1.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A method of storing geographically-referenced data, the method comprising:
   generating a first index value for first geographically-referenced data, the first index value representative of a first geographic location corresponding to the first geographically-referenced data;
   storing the first geographically-referenced data and the first index value in a storage device such that the first geographically-referenced data is stored contiguous to other geographically-referenced data of the first geographic location in a physically-sequential manner based on the first index value of the first geographically-referenced data; and
   storing a second index value, and second geographically-referenced data corresponding to the second index value, for a second geographic location encompassing the first geographic location, the second index value corresponding to the first index value from which a least significant digit has been truncated to reference a larger geographic area than that indicated by the first index value, the second data corresponding to surveillance activity over the larger geographic area, the first geographically-referenced data being a subset of the second geographically-referenced data, the second geographically-referenced data being stored in a first regional server at a location within the second geographic location and the second geographically-referenced data being stored in a physically-sequential manner based on corresponding index values for geographically-referenced data within the larger geographic area.

2. The method of claim 1, wherein storing the geographically-referenced data comprises:
storing the geographically-referenced data in a distributed manner in two or more storage devices such that geographically-referenced data relevant to a first geographic region is stored on a same storage device as other geographically-referenced data relevant to the first geographic region.

3. The method of claim 2, further comprising:
storing the geographically-referenced data such that the geographically-referenced data is arranged in a physically sequential manner in an order based on index values for the geographically-referenced data.

4. The method of claim 3, wherein each of the two or more storage devices is geographically located within its corresponding geographic region.

5. The method of claim 1, wherein the index value includes a first numerical digit and a second numerical digit,
the first numerical digit being representative of a first geographic area that includes the geographic location,
the second numerical digit being representative of a second geographic area smaller than the first geographic area, the second geographic area being a subset of the first geographic area such that the second geographic area also includes the geographic location.

6. The method of claim 5, wherein the first numerical digit is a more significant digit of the index value than the second numerical digit.

7. The method of claim 1, further comprising:
receiving the geographically-referenced data from a social application.

8. The method of claim 7, wherein the social application includes a message texting application, a blogging application, or a social media application.

9. The method of claim 8, further comprising:
storing, a time stamp representative of a time associated with the geographically-referenced data such that the time stamp is associated with the geographically-referenced data.

10. The method of claim 7, further comprising:
storing social context data associated with the geographically-referenced data, the social context data for determining expected activity patterns at the geographical location.

11. A method for analyzing activity patterns in a geographic location, the method comprising:
accessing a database with a processor, using first index values representative of the geographic location, to retrieve data relevant to the geographic location, the database being stored in a first regional server within the geographic location, and data being stored in a physically-sequential manner, and contiguous in physical memory, based on the first index values for the data;
analyzing surveillance activity patterns at the geographic location based on time stamps associated with the retrieved data;
generating a model to describe the activity patterns of the geographic location;
storing the model in the database such that the model is associated with the index value representative of the geographic location; and
analyzing surveillance activity patterns of a second geographic location geographically encompassing the geographic location by accessing the database using a second index value, the second index value corresponding to the first index values from which a least significant digit has been truncated to reference a larger geographic area than that indicated by the first index value.

12. The method of claim 11, wherein an index value of the first index values includes
a first numerical digit and a second numerical digit,
the first numerical digit being representative of a first geographic area that includes the geographic location,
the second numerical digit being representative of a second geographic area smaller than the first geographic area, the second geographic area being included within the first geographic area such that the second geographic area also includes the geographic location.

13. The method of claim 12, further comprising:
generating a human-readable label for the geographic location based on social media data captured with respect to the geographic location; and
storing the human-readable label such that that the human-readable label is associated with the index value representative of the geographic location.

14. The method of claim 12, further comprising:
detecting an unusual activity pattern based on social context information stored in association with the data.

15. A system comprising:
one or more computing devices configured to
generate a first index value for first geographically-referenced data, the first index value representative of a first geographic location corresponding to the first geographically-referenced data, the first index value including a first numerical digit and a second numerical digit that is a less significant digit of the first index value than the first numerical digit, the first numerical digit being representative of a first geographic area that includes the first geographic location, and the second numerical digit being representative of a second geographic area smaller than the first geographic area, the second geographic area being included within the first geographic area such that the second geographic area also includes the first geographic location; and
one or more storage devices configured to store the first geographically-referenced data and the first index value such that the first geographically-referenced data is stored contiguously with other geographically-referenced data of the first geographic location based on the first index value in a first regional server and in a physically-sequential manner based on the first index value of the first geographically referenced data, and to store a second index value for a second geographic location close to the first geographic location, the second index value corresponding to the first index value from which a least significant digit has been truncated to reference a larger geographic area than that indicated by the first index value, the second data corresponding to surveillance activity over the larger geographic area, the first geographically-referenced data being a subset of the second geographically-referenced data, the second geographically-referenced data being stored in the first regional server at a location within the second geographic location and the second geographically-referenced data being stored in a physically-sequential manner based on corresponding index values for geographically-referenced data within the larger geographic area.

16. The system of claim 15, wherein
the one or more storage devices are further configured to store the geographically-referenced data in a distributed manner such that geographically-referenced data relevant to a first geographic region is stored on a same storage device, in a physically-sequential manner based on index values of the geographically-referenced data, as other geographically-referenced data relevant to the first geographic region.

17. A non-transitory computer-readable medium storing instructions that, when executed on a machine, cause the machine to:
access a database, using first index values representative of a first geographic location, to retrieve first data relevant to surveillance activity within the geographic location, an index value of the first index values including
a first numerical digit and a second numerical digit,
the first numerical digit being representative of a first geographic area that includes the first geographic location,
the second numerical digit being representative of a second geographic area smaller than the first geographic area, the second geographic area being included within the first geographic area such that the second geographic area also includes the geographic location;
analyzing surveillance activity patterns at the first geographic location based on time stamps associated with the retrieved data; and
analyze activity patterns of another geographic location within a geographic area that includes the geographic location by accessing the database using a second index value, the second index value corresponding to the first index values from which a least significant digit has been truncated to reference a larger geographic area than that indicated by the first index value, the second data corresponding to surveillance activity over the larger geographic area, the first geographically-referenced data being a subset of the second geographically-referenced data, the second geographically-referenced data being stored in a first regional server at a location within the second geographic location and the second geographically-referenced data being stored in a physically-sequential manner based on corresponding index values for geographically-referenced data within the larger geographic area.

18. The non-transitory computer-readable medium of claim 17, further comprising instructions that, when implemented on the machine, cause the machine to:
generate a model to describe an activity pattern of the geographic location; and
store the model such that the model is associated with the index value representative of the geographic location.

19. The non-transitory computer-readable medium of claim 18, further comprising instructions that, when implemented on the machine, cause the machine to:
generate a human-readable label for the geographic location based on social media data captured with respect to the geographic location; and
store the human-readable label such that that the human-readable label is associated with the index value representative of the geographic location.

* * * * *